3,106,465

NAPHTHOQUINONE DIAZIDE LITHOGRAPHIC MATERIAL AND PROCESS OF MAKING PRINTING PLATES THEREWITH

Wilhelm Neugebauer, Wiesbaden-Biebrich, and Fritz Endermann, Wiesbaden, Germany, assignors, by mesne assignments, to Azoplate Corporation, Murray Hill, N.J., a corporation of New Jersey No Drawing. Filed Dec. 15, 1955, Ser. No. 553,392
Claims priority, application Germany Mar. 11, 1953
47 Claims. (Cl. 96—33)

The present invention relates to the field of photomechanical reproduction such as planographic and planographic offset printing. It is more particularly concerned with a new light-sensitive material comprising as the light-sensitive substance a particular type of naphthoquinone-(1,2)-diazide-sulfonic ester, this new material being suitable for photomechanical transformation into planographic printing plates.

Printing plates, especially those for planographic printing, have been prepared by coating a layer-support, specifically a metal plate or metal foil, e.g. an aluminum or zinc plate, with a layer of a water-insoluble naphthoquinone-(1,2)-diazide-sulfonic acid ester, drying the coated layer, exposing the light-sensitive material thus obtained to light under a pattern, and developing the exposed layer to an image by means of dilute alkaline solutions, e.g. a dilute di- or trisodium-phosphate solution. If a positive pattern is used, the image obtained is a positive reproduction of the pattern and is receptive to greasy ink, so that copies of the pattern can be reprinted in a printing machine. Compounds containing several naphthoquinone-(1,2)-diazide-sulfonyl-residues in their molecules also are included within the group of naphthoquinone-(1,2)-diazide-sulfonic acid esters suitable for the production of printing plates.

The naphthoquinone-(1,2)-diazide-sulfonic acid esters referred to above as being previously known do not contain free hydroxyl groups. It has now been found, that printing plates of outstanding value are obtained by a photomechanical process if the light-sensitive material used therein is produced from metal plates or metal foils (preferably aluminum plates or aluminum foils) and naphthoquinone-(1,2)-diazide-sulfonic acid esters having a specific constitution which includes free hydroxyl groups. The naphthoquinone-(1,2)-diazide-sulfonic acid esters, to be used according to the present invention, correspond to one of the general formulae:

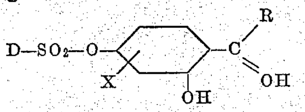

or

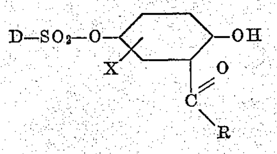

wherein:

D stands for a naphthoquinone-(1,2)-diazide radical,

X stands for a member selected from the group consisting of H and OH,

R stands for a member selected from the group consisting of hydrogen, $OR_1$, $NR_2R_3$, alkyl-, aryl- and heterocyclic radicals, $R_1$ stands for a member of the group consisting of alkyl and aryl, $R_2$ and $R_3$ stand for a member of the group consisting of hydrogen, alkyl and aryl, $R_2$ equalling $R_3$ or being different from $R_3$.

The aryl radical represented by R in the above shown general formula may be substituted, for instance, by alkyl, halogens, alkoxy-, aroxy- and naphthoquinone-(1,2)-diazide-sulfonyl-hydroxy-radicals.

The terms "alkyl," "aryl" and "heterocyclic" as used above, and as used hereinafter, are considered to include within their scope both substituted and unsubstituted alkyl, aryl and heterocyclic radicals, respectively.

The naphthoquinone-(1,2)-diazide-sulfonic acid esters corresponding to the above mentioned formulae are water-insoluble. They are dissolved in organic solvents and then coated onto the layer support in a known manner. They are obtained by condensing, in an organic solvent (preferably dioxane) at room temperature, equimolecular quantities of a naphthoquinone-(1,2)-diazide-sulfonic acid chloride and a compound corresponding to one of the general formulae:

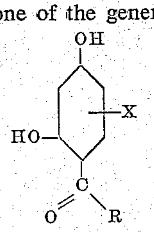

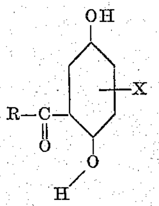

wherein X and R are as above defined in the generic formulae. The condensation takes place in the presence of alkali bicarbonates or alkali carbonates, which are added to the reaction mixture in the form of aqueous solutions. To avoid the formation of a dye, the condensing agents may be added to the reaction mixtures only in a quantity such that the solvent in which the reaction takes place shows only a weakly alkaline or a neutral reaction after the condensation has been completed. Generally, alkali bicarbonates are preferred for use as condensing agents. For the condensation of naphthoquinone-(1,2)-diazide-(2)-5-sulfonic acid chloride with a derivative of the pyrogallol series, however, the use of alkali carbonates as condensing agents is advisable. In order to isolate the condensation product, the reaction solution is filtered with animal charcoal and the condensation product is precipitated by adding dilute hydrochloric acid to the filtered solution. After the condensation product is separated from the liquid by filtration and the remaining acid is removed by washing, the condensation product may be used immediately for the production of the light-sensitive layer.

The following method illustrates one method of preparing the naphthoquinone-(1,2)-diazide-sulfonic acid esters to be used according to the present invention.

27 g. (=1/10 mol) of naphthoquinone-(1,2)-diazide-(2)-sulfonic acid chloride and 1/10 mol of the phenolic component, e.g. 23 g. of 2,3,4-trihydroxy-benzophenone, are dissolved in 250 cc. of dioxane, and, while this is being stirred, 75 cc. of a 20% soda solution or 100 cc. of a saturated sodium bicarbonate solution are added at room temperature during a period of 30 minutes. After some hours the condensation is completed. The reaction solution is agitated for some time with animal charcoal and drawn off. While being thoroughly stirred, the filtrate is poured into 5 liters of water, to which 50 cc. of concentrated hydrochloric acid have been added. The precipitated yellow-brown colored naphthoquinone-diazide-sulfonic acid ester is drawn off, washed free from acid by means of water, and dried.

The printing plate is produced photomechanically from the light-sensitive material, by exposing the light-sensitive layer to a light image, e.g. under a pattern, and developing the exposed layer to an intensively yellow-colored image, by means of dilute alkaline solutions. The developed layer is then rinsed with water. By treating the imaged surface of the aluminum support with a solution of about 1% phosphoric acid which may contain dextrine or gum arabic, the aluminum is rendered water-receptive in the areas struck by light. These areas are hereinafter referred to as "non-imaged areas." The portions of the diazo compound remaining adherent to the support are inked with greasy ink. These latter portions constitute the image. The areas of the support occupied by the non-decomposed diazo compound are hereinafter referred to as "imaged areas." Thus, from positive patterns, positive images are obtained, which may be used for reprinting in a printing machine.

In the following table there is set forth examples of the naphthoquinone-(1,2)-diazide sulfonic acid esters, corresponding to the general formulae mentioned above, which are intended to be used according to the teaching of this invention for the production of the light-sensitive layer on metal sheets, especially on aluminum. The table includes data as to the melting points and the decomposition points of the compounds, the starting materials used for their production, the condensing agent preferred to be used, and the most suitable developer. The following abbreviations are used:

*a*=a saturated sodium bicarbonate solution,
*b*=a sodium bicarbonate solution,
*c*=a 2% soda solution,
*d*=a 1.5% trisodium phosphate solution, and
*e*=a 2% borax solution.

In the column headed "starting materials":

$D_4$ is the abbreviation for naphthoquinone-(1,2)-diazide-(2)-4-sulfonic acid chloride,
$D_5$ the abbreviation for naphthoquinone-(1,2)-diazide-(2)-5-sulfonic acid chloride.

TABLE

| Formula No. | Melting point or decomposition point | Starting material | Condensing agent | Developer |
|---|---|---|---|---|
| 1 | 136 | 2,5-dihydroxydenzophenone; $D_4$ | $NaHCO_3$ | *b* |
| 2 | 232 | 2,5-dihydroxybenzaldehyde; $D_5$ | $NaHCO_3$ | *d* |
| 3 | 236 | 2,4-dihydroxy-acetophenone; $D_4$ | $NaHCO_3$ | *e* |
| 4 | 122 | 2,4-dihydroxy-acetophenone; $D_5$ | $NaHCO_3$ | *d* |
| 5 | 111 | 2,4-dihydroxy-benzoic-acid-methyl-ester; $D_4$ | $NaHCO_3$ | *e* |
| 6 | 164 | 2,4-dihydroxybenzanilide; $D_4$ | $NaHCO_3$ | *d* |
| 7 | 280 | 2,4,5-trihydroxybenzaldehyde; $D_5$ | $NaHCO_3$ | *d* |
| 8 | 200 | 2,4,6-trihydroxybenzaldehyde; $D_3$ | $NaHCO_3$ | *d* |
| 9 | 194 | 2,3,4-trihydroxy-benzophenone; $D_4$ | $NaHCO_3$ | *e* |
| 10 | 190 | 2,3,4-trihydroxy-benzophenone; $D_5$ | $Na_2CO_3$ | *d* |
| 11 | 110 | 2,3,4-trihydroxy-phenylnaphthyl-(1)-ketone; $D_4$ | $NaHCO_3$ | *d* |
| 12 | 180 | 2,3,4-trihydroxyphenylnaphthyl-(1)-ketone; $D_5$ | $Na_2CO_3$ | *d* |
| 13 | 245 | 2,3,4-trihydroxyphenylanthraquinoyl-(2)-ketone; $D_5$ | $Na_2CO_3$ | *e* or *c* |
| 14 | 235 | 2,3,4-trihydroxy-phenyl-furyl-(1)-ketone; $D_5$ | $Na_2CO_3$ | *c* |
| 15 | 113 | N-phenyl-5-methyl-pyrazole-(3)-2′,3′,4′-trihydroxyphenyl (1)-ketone; $D_5$ | $Na_2CO_3$ | *d* |
| 16 | 190 | 2,3,4,-trihydroxy-2′-chloro-benzophenone; $D_5$ | $Na_2CO_3$ | *e* or *a* |
| 17 | 140 | 2,3,4-trihydroxy-4′-methyl-benzophenone; $D_5$ | $Na_2CO_3$ | *d* |
| 18 | 205 | 2,3,4-trihydroxy-4′-methoxy-benzophenone; $D_5$ | $Na_2CO_3$ | *d* or *c* |
| 19 | 238 | 2,3,4-trihydroxy-2′,5′-dimethoxy-benzophenone; $D_5$ | $Na_2CO_3$ | *d* or *c* |
| 20 | 148 | 2,3,4-trihydroxy-2′,4′-dimethoxy-benzophenone; $D_5$ | $Na_2CO_3$ | *d* or *c* |
| 21 | 210 | 2,3,4-trihydroxy-benzoic acid-diphenylamide; $D_5$ | $Na_2CO_3$ | *d* |
| 22 | 136 | 2,3,4,2′-tetrahydroxy-benzophenone-(1/100 mol); $D_5$ (1/50 mol) | $Na_2CO_3$ | *d* |
| 23 | 300 | 2,3,4,4′-tetrahydroxy-benzophenone-(1/100 mol); $D_5$ (1/50 mol) | $Na_2CO_3$ | *d* |

The following formulae are referred to in the above table, and are set forth to exemplify several of the compounds within the scope of the invention.

(1)

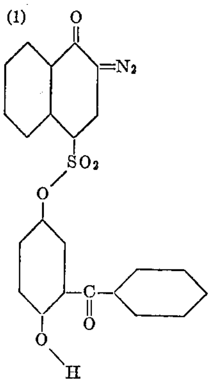

(2)

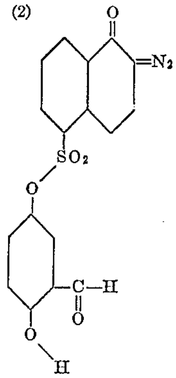

(3)

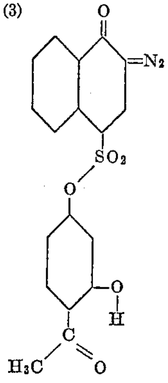

(4)

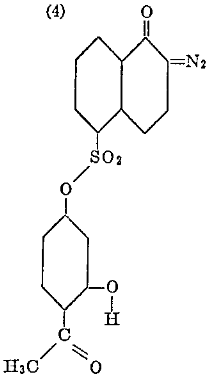

(5)

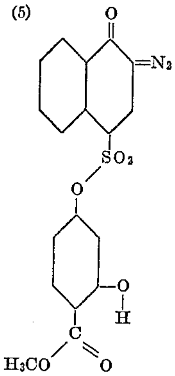

(6)

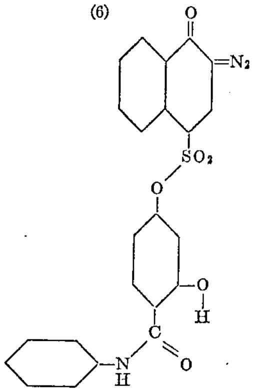

(7)

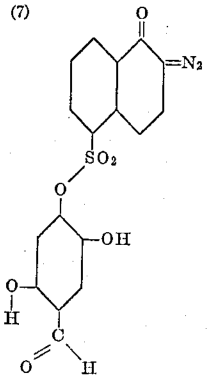

(8)

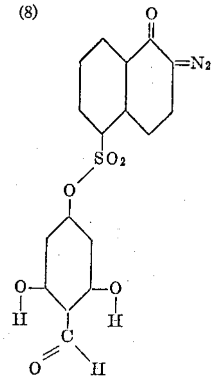

(9)
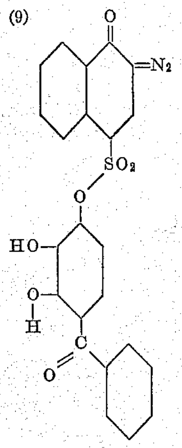
(10)
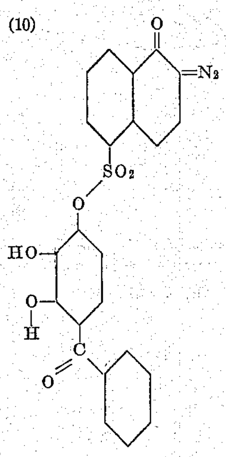
(11)
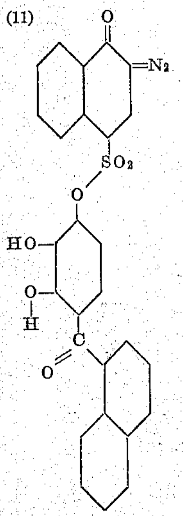
(12)
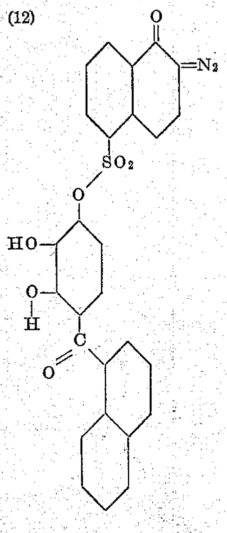
(13)
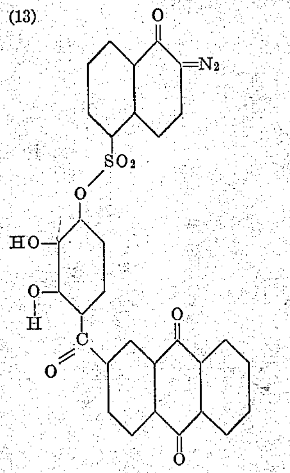
(14)
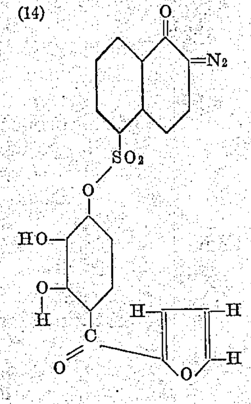
(15)
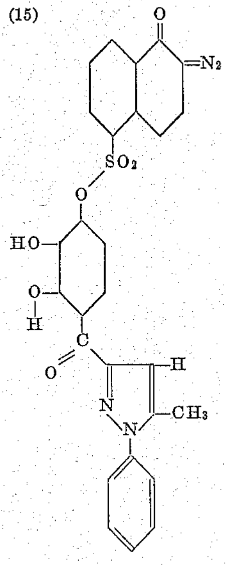
(16)
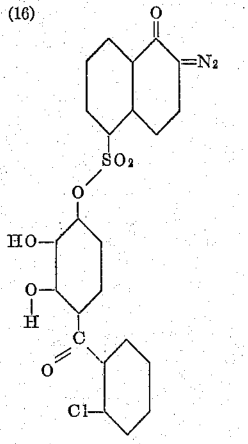
(17)
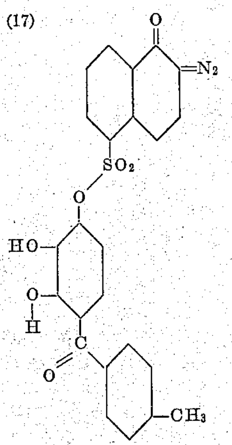
(18)
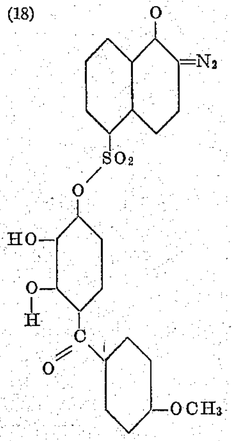
(19)
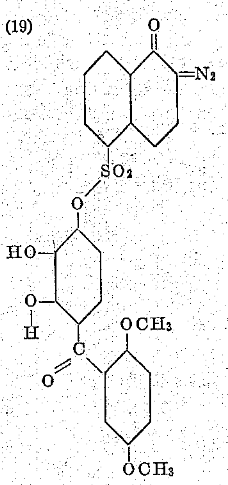
(20)
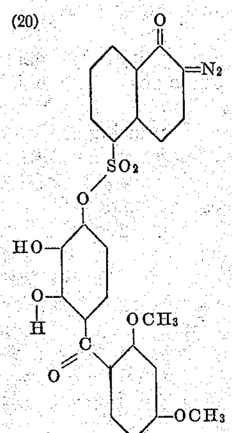

(21)

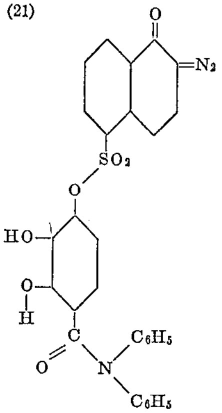

(22)

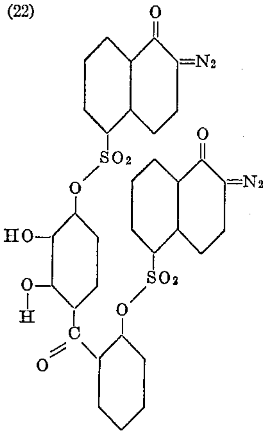

(23)

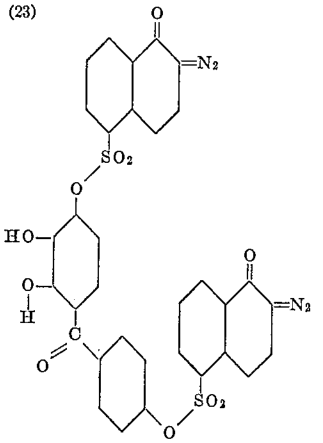

The light-sensitive aluminum plates or aluminum foils produced according to the invention, distinguish themselves from previously known products of this kind by the fact that their light-sensitivity is greater and that they do not produce the undesired so-called "glass effect" when used. By the term "glass effect" is meant the phenomenon occurring in practicing the above described process resulting in ink-receptivity of those areas of the printing plate, which during the exposure to light have come into contact with the glass plate of the copying apparatus. Those areas that are not covered by the pattern contact the glass of the copying frame and often show a feeble coloring. This coloring is very difficult to remove and becomes obvious when the printing plates are used for printing because it causes a coloring of the background of the reprinted images. It has been found that a few of the naphthoquinone-(1,2)-diazide-sulfonic acid esters used in the practice of the present invention lead to this undesired result, i.e. "glass effect." It has been found that when using naphthoquinone diazide sulfonic acid esters which are attended with the disagreeable "glass effect," this undesired phenomenon may be obviated by using as the coating for aluminum foils a mixture of these esters with a naphthoquinone-(1,2)-diazide sulfonic acid ester of the present invention, particularly an ester formed with a compound of the pyrogallol series.

From a consideration of the prior art and previous experience it was surprising to learn that the naphthoquinone-(1,2)-diazide-sulfonic acid esters, of the above-mentioned general formulas, can be used for the purpose of the invention. Because of the free hydroxyl groups present in their molecules it was supposed that such esters would be dissolved on treatment with alkaline liquids, i.e. that the diazo compound not struck by light during the exposure would be dissolved during the alkaline development. This result was thought to be existent especially when using sulfonic acid esters which are formed by condensation with derivatives of trihydroxybenzene. By experiments it was determined that the resistance to dissolution by alkaline liquids, of the non-light decomposed diazo compound of the invention and the adhesion of the developed image to the aluminum surface are excellent. Particularly good results are obtained when using condensation products obtained from pyrogallol derivatives.

The following examples are inserted merely for the purpose of illustrating the present invention. Restriction of the scope of the invention to the contents of the examples is not intended.

*Examples*

(1) 2 g. of the 2,3,4-trihydroxy-benzophenone-naphthoquinone-(1,2)-diazide-(2)-5-sulfonic acid ester of the Formula 10 are dissolved in 100 cc. of glycol-mono-methylether. Then a mechanically roughened aluminum foil is coated in a known manner with the filtered solution, and the thus produced layer is dried by means of hot air.

For the production of a printing plate, the layer-side of the foil is exposed to light under a pattern and then treated with a cotton swab, which is soaked in a solution of about 1.5% trisodium phosphate. A yellow colored image of the pattern appears in the areas not struck by light. After rinsing the foil with water, the image is prepared for printing by wiping it over with a cotton swab, which is soaked in a 1% phosphoric acid solution containing gum arabic or dextrin.

(2) 1 g. of the naphthoquinone-(1,2)-diazide-(2)-5-sulfonic acid monoester corresponding to Formula 10 and 1 g. of the naphthoquinone-(1,2)-diazide-(2)-5-sulfonic acid bis-ester of 2,2'-dihydroxy-dinaphthyl-1,1'-methane having the formula

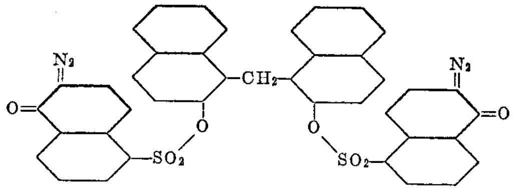

are dissolved in 100 cc. of glycol-monomethylether. An aluminum foil is then coated with the solution and the layer is dried. The production of a printing foil is effected by developing the layer-side after it has been exposed to light under a pattern, following the procedure described in Example 1.

The printing foil, which is produced following the above-mentioned directions, does not show any tendency to greasy ink-receptivity in the areas which came into direct contact with the glass during the exposure to light in the copying apparatus, while an aluminum foil coated only with the bis-ester of the above-described formula frequently shows undesired ink receptivity in the same areas.

(3) The napthoquinone-(1,2)-diazide sulfonic acid esters of the derivatives of pyrogallol, e.g. of the compounds of the Formulas 10 and 12, are made up into a mixture of any proportions. 2 g. of the mixture are dissolved in 100 cc. of glycol-monomethyl-ether, and an aluminum foil is coated with the solution thus prepared as described in Example 1.

(4) 2 g. of the napthoquinone-(1,2)-diazide-(2)-5-sulfonic acid ester of 2,5-dihydroxy-benzaldehyde, corresponding to Formula 2, are dissolved in 100 cc. of glycol-monomethylether, and then the further procedure is as described in Example 1.

(5) 2 g. of the naphthoquinone-(1,2)-diazide-(2)-4-sulfonic acid ester of the 2,4-dihydroxy-benzoic acid-methylester corresponding to Formula 5 are dissolved in 100 cc. of glycol-monomethylether, and an aluminum foil is coated with the said solution. The coating is dried. For the development of the foil (i.e. after exposure to light under a pattern), and in order to produce a printing foil, a 2% borax solution is used.

(6) 2 g. of a mixture of several naphthoquinone-(1,2)-diazide-(2)-4-sulfonic acid esters of the pyrogallol derivatives, e.g. of a mixture of the compounds having the constitutional Formulas 9 and 11, are dissolved in 100 cc. of glycol-monomethylether, and an aluminum foil is coated with the solution. The layer is dried. After exposure to light under a pattern the aluminum foil is developed with a 2% soda solution for the purpose of making a printing foil. Further procedure is as described in Example 1.

(7) 2 g. of the naphthoquinone-(1,2)-diazide-(2)-5-sulfonic acid bis-ester of 2,3,4,2′ or 2,3,4,4′-tetrahydroxybenzophenone corresponding to Formulas 22 and 23, respectively, are dissolved in 100 cc. of glycol-monomethylether. The solution is coated onto an aluminum foil and dried. The aluminum foil is then exposed to light under a pattern to produce a printing foil, and developed with a 1.5% trisodium phosphate solution.

(8) The surface of a grained zinc foil is cleaned by scrubbing with an aqueous solution containing 5% of alum and 5% of glacial acetic acid and rinsing with water. The foil is then dried by means of warm air as customary in the printing art. Subsequently, the zinc foil is coated with a 4% solution of the compound corresponding to the Formula 10 in glycol monomethyl ether. The thus sensitized foil is then dried by means of warm air.

After exposing the foil under a transparent pattern, it is developed by swabbing with a 2.5% aqueous solution of trisodium phosphate. A yellow colored image of the pattern becomes visible on the foil in those areas which were not struck by light. The foil is then rinsed with water and finished for printing as usual.

(9) An unsensitized paper-printing foil, for instance the foil manufactured according to U.S. Patent No. 2,681,617, is coated with a 2% solution of the compound of Formula 10 in glycol monomethyl ether, and the foil is then dried with warm air.

A paper foil thus sensitized is exposed to light under a transparent pattern and the light-decomposition product of the diazo compound is then removed in the light-struck areas by wiping the foil over with a cotton swab soaked in an about 2.5% aqueous solution of trisodium phosphate. The surplus developer is removed with a cotton swab. The foil is then finished for printing by wiping over with a wetting agent, as for instance "Platex Green." The foil is then inked either manually or in the printing machine. Those areas of the foil which were not struck by light are receptive to greasy ink.

This application is a continuation-in-part of co-pending application Serial Number 415,146 filed March 9, 1954, and now abandoned.

We claim:

1. A compound having the formula

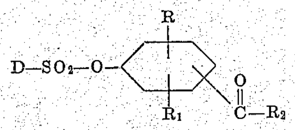

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is selected from the group consisting of hydrogen, alkyl, aryl, alkoxy, and amino groups.

2. A compound having the formula

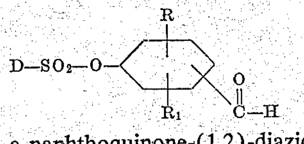

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group.

3. A compound having the formula

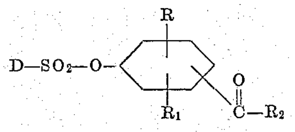

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkyl group.

4. A compound having the formula

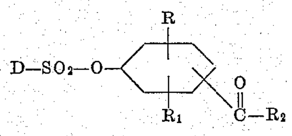

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an aryl group.

5. A compound having the formula

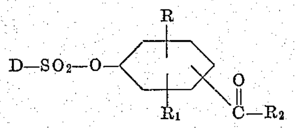

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkoxy group.

6. A compound having the formula

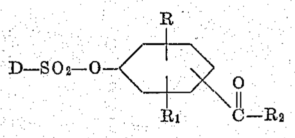

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an amino group.

7. A compound having the formula

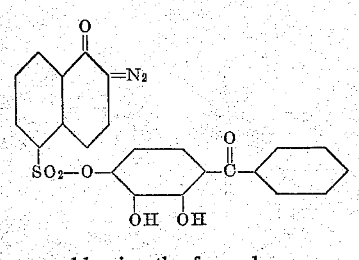

8. A compound having the formula

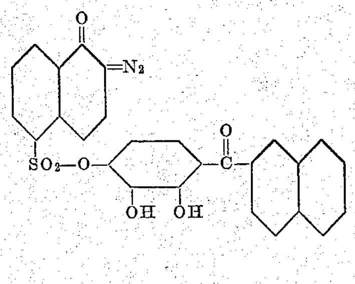

9. A compound having the formula

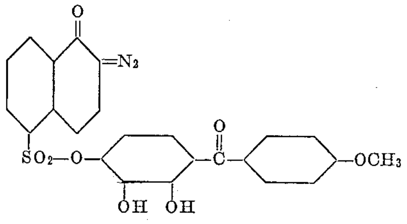

10. A compound having a formula

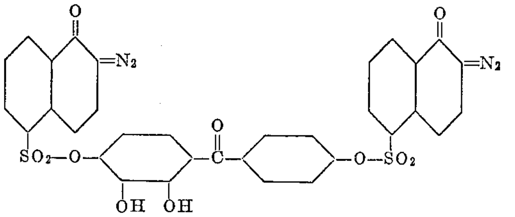

11. A presensitized printing plate comprising a base material having a coating thereon, the coating comprising a compound having the formula

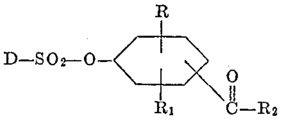

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is selected from the group consisting of hydrogen, alkyl, aryl, alkoxy, and amino groups.

12. A presensitized printing plate comprising a base material having a coating thereon, the coating comprising a compound having the formula

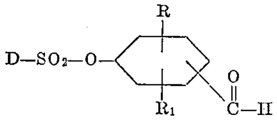

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group.

13. A presensitized printing plate comprising a base material having a coating thereon, the coating comprising a compound having the formula

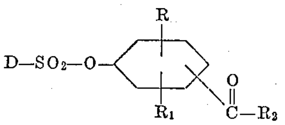

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkyl group.

14. A presensitized printing plate comprising a base material having a coating thereon, the coating comprising a compound having the formula

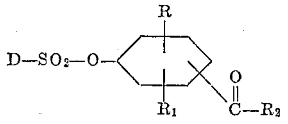

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an aryl group.

15. A presensitized printing plate comprising a base material having a coating thereon, the coating comprising a compound have the formula

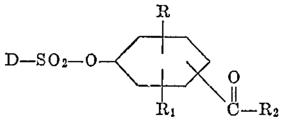

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkoxy group.

16. A presensitized printing plate comprising a base material having a coating thereon, the coating comprising a compound having the formula

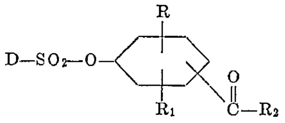

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an amino group.

17. A presensitized printing plate comprising a base material having a coating thereon, the coating comprising a compound having the formula

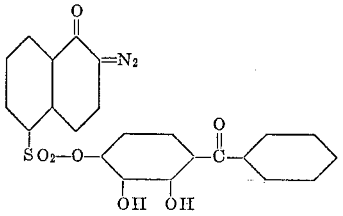

18. A presensitized printing plate comprising a base material having a coating thereon, the coating comprising a compound having the formula

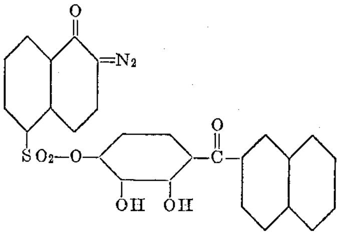

19. A presensitized printing plate comprising a base material having a coating thereon, the coating comprising a compound having the formula

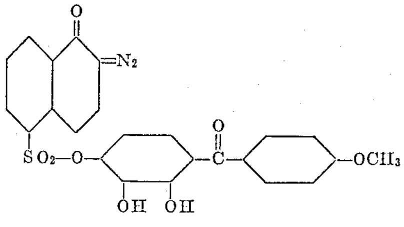

20. A presensitized printing plate comprising a base material having a coating thereon, the coating comprising a compound having the formula

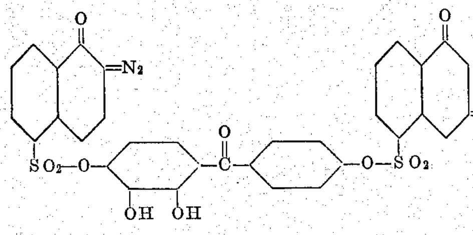

21. A process for making a printing plate which comprises exposing a coated base material to light under a master, the coating comprising a compound having the formula

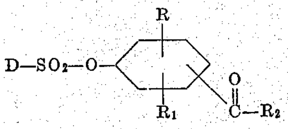

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is selected from the group consisting of hydrogen, alkyl, aryl, alkoxy, and amino groups, and treating the exposed coating with a weakly alkaline developing solution.

22. A process for making a printing plate which comprises exposing a coated base material to light under a master, the coating comprising a compound having the formula

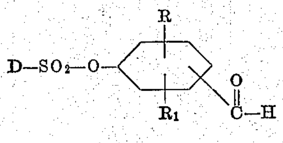

in which D is a naphthoquinone-(1,2)-diazide radical and R and $R_1$ are selected from the group consisting of hydrogen and hydroxyl, at least one of R and $R_1$ being hydroxyl and being in ortho position to the carbonyl group, and treating the exposed coating with a weakly alkaline developing solution.

23. A process for making a printing plate which comprises exposing a coated base material to light under a master, the coating comprising a compound having the formula

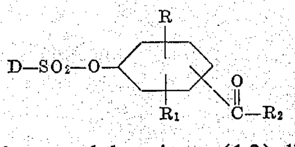

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkyl radical, and treating the exposed coating with a weakly alkaline developing solution.

24. A process for making a printing plate which comprises exposing a coated base material to light under a master, the coating comprising a compound having the formula

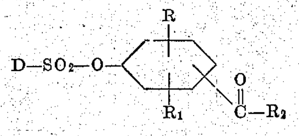

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an aryl group, and treating the exposed coating with a weakly alkaline developing solution.

25. A process for making a printing plate which comprises exposing a coated base material to light under a master, the coating comprising a compound having the formula

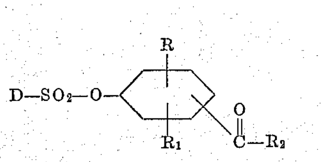

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an alkoxy group, and treating the exposed coating with a weakly alkaline developing solution.

26. A process for making a printing plate which comprises exposing a coated base material to light under a master, the coating comprising a compound having the formula

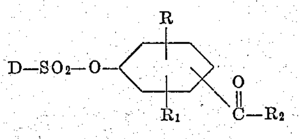

in which D is a naphthoquinone-(1,2)-diazide radical, R and $R_1$ are selected from the group consisting of hydrogen and hydroxyl, at least one of R and $R_1$ being hydroxyl and being in ortho position to the carbonyl group, and $R_2$ is an amino group, and treating the exposed coating with a weakly alkaline developing solution.

27. A process for making a printing plate which comprises exposing a coated base material to light under a master, the coating comprising a compound having the formula

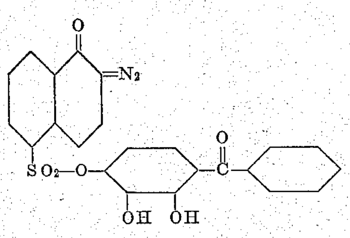

and treating the exposed coating with a weakly alkaline developing solution.

28. A process for making a printing plate which comprises exposing a coated base material to light under a master, the coating comprising a compound having the formula

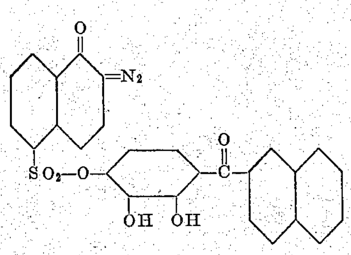

and treating the exposed coating with a weakly alkaline developing solution.

29. A process for making a printing plate which comprises exposing a coated base material to light under a master, the coating comprising a compound having the formula

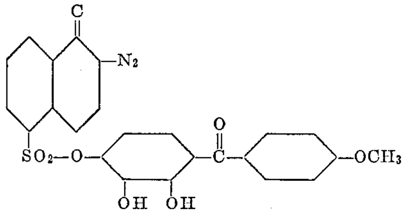

and treating the exposed coating with a weakly alkaline developing solution.

30. A process for making a printing plate which comprises exposing a coated base material to light under a master, the coating comprising a compound having the formula

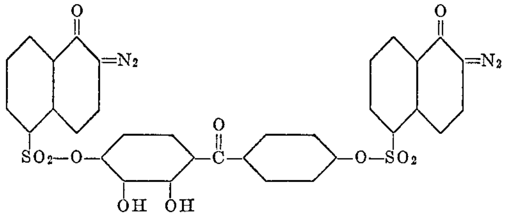

and treating the exposed coating with a weakly alkaline developing solution.

31. A compound having the formula

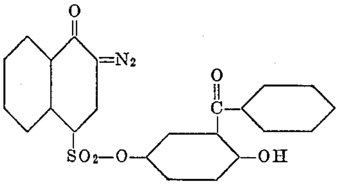

32. A compound having the formula

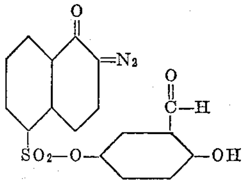

33. A compound having the formula

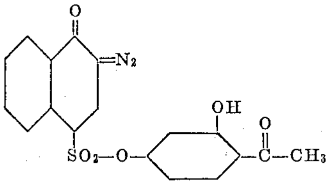

34. A compound having the formula

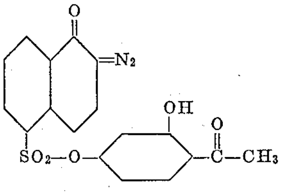

35 A compound having the formula

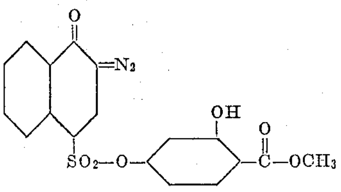

36. A compound having the formula

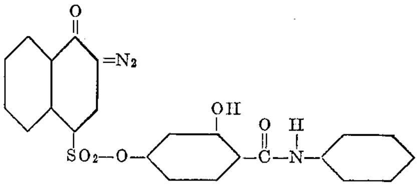

37. A compound having the formula

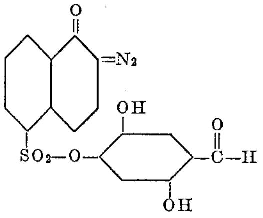

38. A compound having the formula

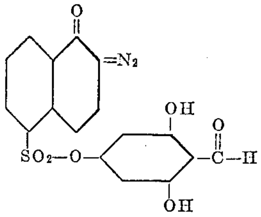

39. A compound having the formula

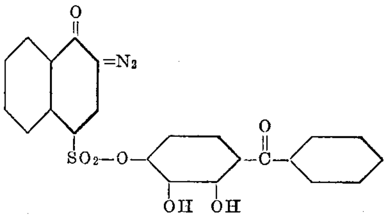

40. A compound having the formula

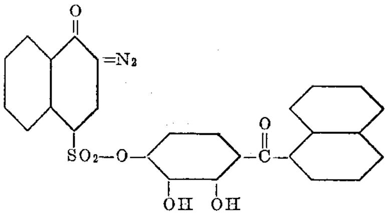

41. A compound having the formula

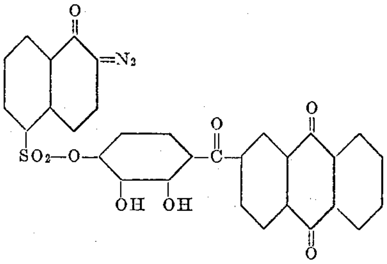

42. A compound having the formula

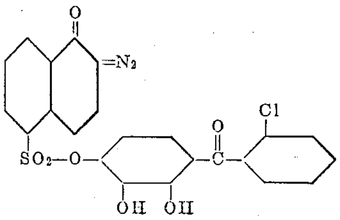

43. A compound having the formula
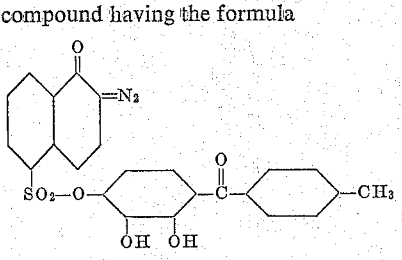
44. A compound having the formula
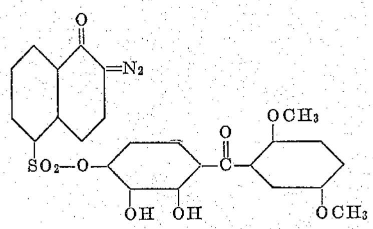
45. A compound having the formula
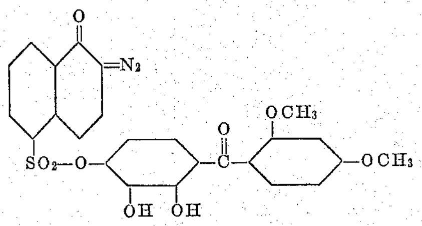
46. A compound having the formula
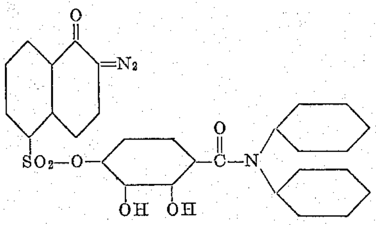
47. A compound having the formula
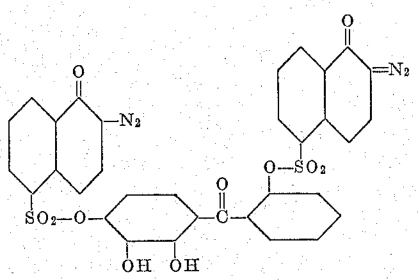
References Cited in the file of this patent
FOREIGN PATENTS
865,109 Germany ______________ Jan. 29, 1953